(12) United States Patent
Bolshinsky et al.

(10) Patent No.: US 10,430,714 B2
(45) Date of Patent: Oct. 1, 2019

(54) AUTOMATIC SUGGESTION OF EXPERTS FOR ELECTRONIC DISCUSSIONS

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 14/937,957

(22) Filed: Nov. 11, 2015

(65) Prior Publication Data

US 2017/0132519 A1    May 11, 2017

(51) Int. Cl.
*G06N 5/04* (2006.01)
*G06N 20/00* (2019.01)
*H04L 12/58* (2006.01)

(52) U.S. Cl.
CPC .............. *G06N 5/04* (2013.01); *G06N 20/00* (2019.01); *H04L 51/14* (2013.01); *H04L 51/32* (2013.01); *H04L 51/046* (2013.01)

(58) Field of Classification Search
CPC ........ G06N 5/04; G06N 99/005; H04L 51/14; H04L 51/32; H04L 51/046; H04L 12/58; G06F 17/3053; G06F 17/30477; G06F 17/30554; G06F 17/30864
USPC .......................................................... 706/11
See application file for complete search history.

(56) References Cited

U.S. PATENT DOCUMENTS

| | | | |
|---|---|---|---|
| 6,829,585 B1 | 12/2004 | Grewal et al. | |
| 7,249,123 B2 | 7/2007 | Elder et al. | |
| 7,530,021 B2 | 5/2009 | Cheng et al. | |
| 7,707,257 B2 | 4/2010 | Taieb et al. | |
| 7,761,549 B2 | 7/2010 | Farnham et al. | |
| 8,271,516 B2 | 9/2012 | Gounares et al. | |
| 8,478,735 B1* | 7/2013 | Archambault | .... G06F 17/30864 707/711 |
| 8,484,040 B2 | 7/2013 | Ashour et al. | |
| 8,751,559 B2 | 6/2014 | Richardson et al. | |
| 8,914,452 B2 | 12/2014 | Boston et al. | |
| 2007/0206086 A1 | 9/2007 | Baron et al. | |
| 2009/0172120 A1 | 7/2009 | Ruelas | |
| 2010/0070554 A1* | 3/2010 | Richardson | ............ G06Q 10/06 709/202 |
| 2010/0174780 A1* | 7/2010 | Choi | ...................... G06Q 10/10 709/204 |

(Continued)

FOREIGN PATENT DOCUMENTS

CA    2613692 A1    6/2009

OTHER PUBLICATIONS

Lin et al., "SmallBlue: Social Network Analysis for Expertise Search and Collective Intelligence", IEEE International Conference on Data Engineering, 2009. (Year: 2009).*

(Continued)

*Primary Examiner* — Dave Misir
(74) *Attorney, Agent, or Firm* — Stephen R. Yoder

(57) ABSTRACT

Techniques are described for automatic suggestion for socially connected experts in electronic discussions. In one example, techniques include extracting topics from an electronic discussion, generating a list of experts in the topics, and editing the list according to social closeness to participants in the electronic discussion.

9 Claims, 3 Drawing Sheets

(56) References Cited

U.S. PATENT DOCUMENTS

| | | |
|---|---|---|
| 2010/0250605 A1* | 9/2010 | Pamu ................ G06F 17/30533 |
| | | 707/783 |
| 2010/0262610 A1 | 10/2010 | Acosta et al. |
| 2012/0203845 A1 | 8/2012 | Lakshmanan et al. |
| 2012/0239748 A1 | 9/2012 | Beerse et al. |
| 2012/0246574 A1 | 9/2012 | Hoard et al. |
| 2012/0313948 A1* | 12/2012 | Bergman ............. G06Q 10/101 |
| | | 345/440 |
| 2013/0007121 A1* | 1/2013 | Fontenot ............. G06Q 10/101 |
| | | 709/204 |
| 2014/0164527 A1* | 6/2014 | Bank ....................... H04L 51/04 |
| | | 709/206 |
| 2014/0310017 A1* | 10/2014 | Palter ................. G06F 19/3425 |
| | | 705/2 |
| 2016/0110372 A1* | 4/2016 | Cho .................... G06F 17/3087 |
| | | 707/724 |
| 2016/0267188 A1* | 9/2016 | Spaulding ......... G06F 17/30867 |

OTHER PUBLICATIONS

Zhang et al., "Expertise Networks in Online Communities: Structure and Algorithms", ACM, WWW 2007, May 8-12, 2007, Banff, Alberta, Canada. (Year: 2007).*

Hochmeister M., "Measuring User Expertise in Online Communities", 2012. (Year: 2012).*

* cited by examiner

AUTOMATIC SUGGESTION OF EXPERTS FOR ELECTRONIC DISCUSSIONS

TECHNICAL FIELD

The invention relates to systems and software for electronic discussion.

BACKGROUND

In social software systems there are often discussions, where the participants are seeking experts' assistance. It can be an on-line meeting, an email thread, a forum discussion or a thread of comments on some document like a wiki page or a blog. When there are unresolved issues, or the parties cannot agree on the correctness of their assumptions, usually one of the participants asks his colleague, who is an expert in the discussed field to step in and help.

Even when such an expert is added to the discussion and expresses his opinion, his opinion is not always acceptable for all the parties. In particular because the expert is not always known to all the parties, or because he might not be considered an expert by all the parties. Another scenario is when the parties find an expert by searching in the system, and then if the expert doesn't know them personally then he might be reluctant to help.

SUMMARY

In general, examples disclosed herein are directed to techniques for automatic suggestion for socially connected experts in electronic discussions. In one example, techniques include extracting topics from an electronic discussion, generating a list of experts in the topics, and editing the list according to social closeness to participants in the electronic discussion.

In other example, a computer system includes one or more processors, one or more computer-readable memories, and one or more computer-readable, tangible storage devices. Program instructions are stored on at least one of the one or more storage devices for execution by at least one of the one or more processors via at least one of the one or more memories, to extract topics from an electronic discussion, generate a list of experts in the topics, and edit the list according to social closeness to participants in the electronic discussion.

In another example, a computer program product includes a computer-readable storage medium has program code embodied therewith. The program code is executable by a computing device to extract topics from an electronic discussion, generate a list of experts in the topics, and edit the list according to social closeness to participants in the electronic discussion.

DETAILED DESCRIPTION

Various examples are disclosed herein for automatic suggestion for socially connected experts in electronic discussions. In one aspect, a system is disclosed for suggesting socially acceptable experts that may help in resolving issues raised during electronic discussions. The system provides a list of experts who know the discussion participants and are known by the participants and considered as experts by them.

Figure 1:
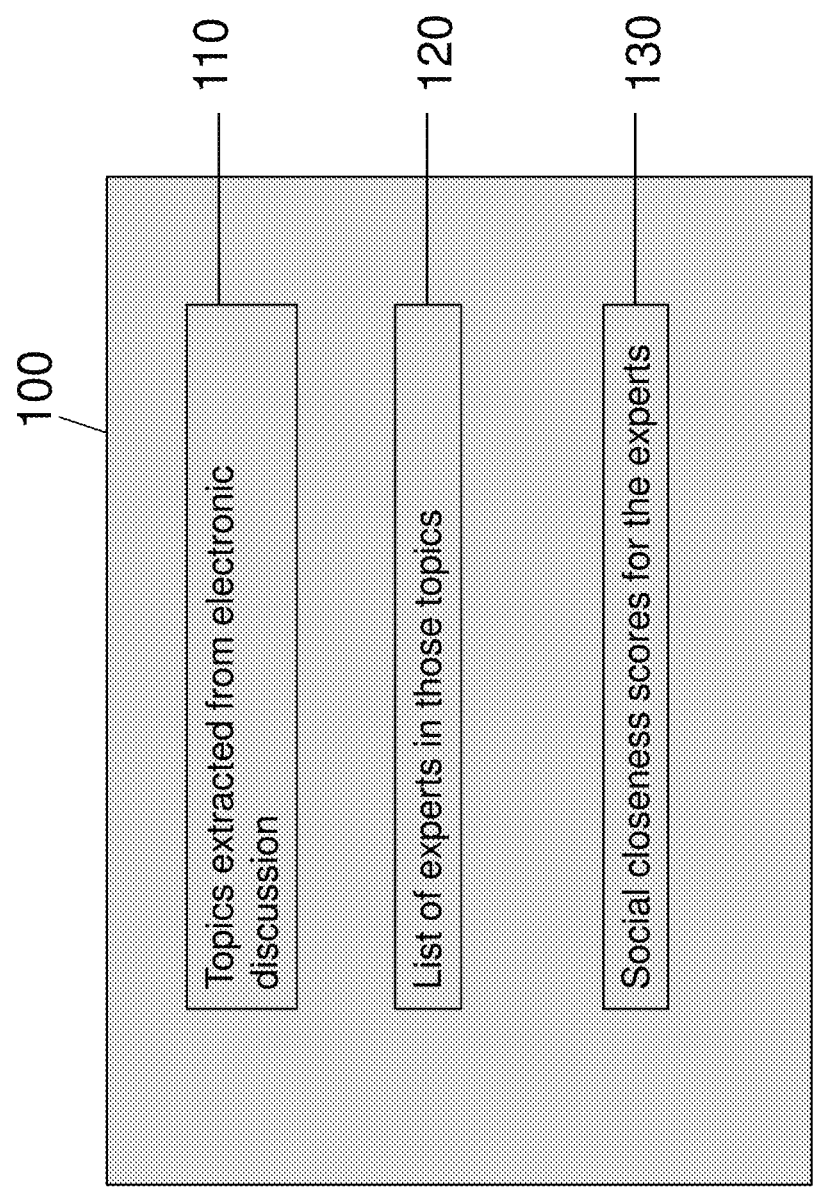
FIG. 1 is a block diagram of a system for electronic discussion.

As shown in FIG. 1, a system 100 for electronic discussion includes topics (110) extracted from the electronic discussion, a list (120) of experts in those topics, and social closeness scores (130) for those experts.

Figure 2:
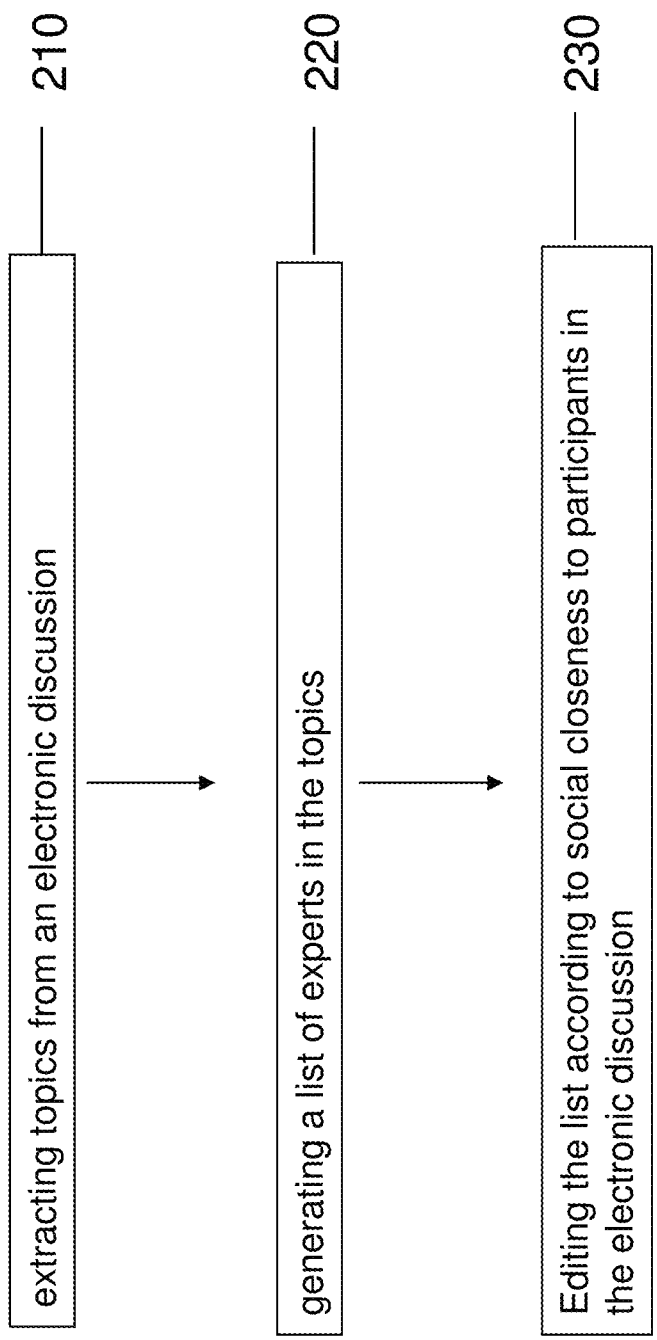
FIG. 2 is a flow diagram illustrating a method for electronic discussion.

As illustrated in FIG. 2, a method 200 for electronic discussion involves extracting topics from an electronic discussion (step 110), generating a list of experts in the topics (step 120), and editing the list according to social closeness to participants in the electronic discussion (step 130).

The discussion thread text may be analyzed in order to identify the discussed topics. The social closeness can be determined by identifying experts that are familiar to one or more of the participants, for example, experts who one or more of the participants may have worked with before. The social closeness can be also determined by identifying those experts who worked with participants on the similar topics recently.

The list may be normalized or converted into a human readable form and sorted in order of the social closeness and presented to one or more of the participants. Each participant may be able to add experts, and the added expert is considered as expert by the other participants. No introduction or explanation is required, leading to more effective discussions.

The above-described techniques can be applied to electronic discussions that are dynamic or more static. For example: instant meeting, or teleconference are very dynamic, while mail thread or Wiki discussion thread are less dynamic. The common part in all these discussions is the need to add from time to time more participants, in particular experts on some discussed topics to help to make progress or resolve arguments.

The most common way to do that is that one of the participants adds his colleague, or friend, to the discussion. This colleague is considered an expert in the discussed topic by the user who added him. He can be a real expert, however, he may be unfamiliar to the rest of participants. Thus his advices may not be accepted with good attitude by those who are not familiar with him, and who do not know that he is an expert. His appearance in the discussion may result in hostility or less trust between the participants, who may think that one party is adding more participants to change the argument in his favor.

In addition, when such an expert is added there is a need to introduce him like: "I am adding John, he is very good with Javascript". Other users may understand that as: "This is my buddy John, he knows some Javascript. He will take my side in the argument." All these can be eliminated if we use a social approach for expert selection.

The above-described techniques enable the discussion participants to see a list of experts, who are socially close to the participants. The list is compiled automatically based on the topics discussed in the thread or the meeting. This can be done to the textual or to non-textual streams of data by converting voice or audio to text, and then applying topic extraction techniques on the result. First the topics are extracted, and the list of experts based on these topics is created. The experts may be found based on their recent activities, while the activities between them and the participants of the discussion are boosted, That means, that the ultimate expert, who is extensively consulting on some topics outside of the group of participant may get lower score than some person who is working on the same topic, within the group of the participants.

Then the list of experts is analyzed, and for each expert a social score is calculated. The closer the expert to all the participants of the discussion, the higher the score will be. One example of a high scoring expert is an expert who is connected to all the participants, and who worked on the discussed topics with all of them. Experts who worked with the participants on the topic at hand are scored higher than experts who are familiar to the participants but haven't worked on the topic at hand with them. The list of experts can be shown on a side part of the discussion, along with the profile information of the expert. His relationship to the participants can be shown too.

When selected, the expert is invited to join the instant meeting or is asked to provide a feedback in the non-instant discussion (e.g. adding him to the email thread or sending him an invitation to reply to a forum topic). The expertise level can be also normalized to provide a clear picture on the strength of expertise. The social score and the expertise should be combined into a summarized score.

For example in a meeting of user1, user2, user3, if the discussed topic is Java the experts will be shown:
  John Smith, Java expert, known by all
  Alain Connor, Java expert, not familiar to user2
  Jason Bay, good at Java, not familiar to user3

Figure 3:
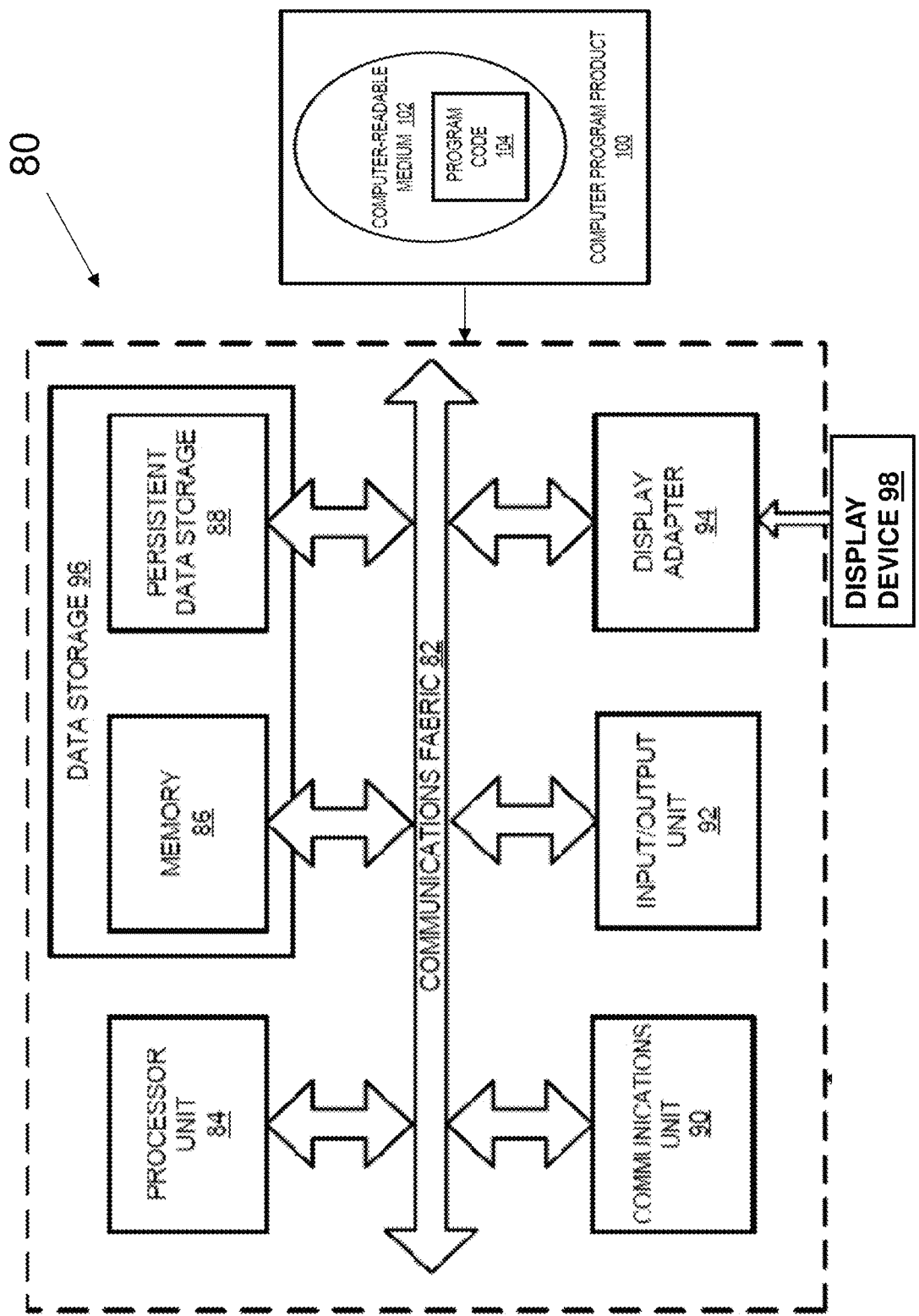
FIG. 3 is a block diagram of a computing device for electronic discussion.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    analyzing a text portion of a discussion thread generated during an electronic discussion in a social software system between a first participant and a second participant;
    extracting a topic from the text portion;
    determining, for the topic, a set of experts associated with the social software system, the set of experts having a level of expertise in the topic;
    generating a list of experts from the set of experts, each expert on the list of experts being socially connected via the social software system with at least one of the first participant and the second participant;
    determining a set of social closeness scores of each expert in the list of experts with respect to the first participant and with respect to the second participant;
    arranging the list of experts as a ranked list by ranking the experts according to a summarized score that combines the set of social closeness scores with a degree of experience of each corresponding expert of the list of experts;
    presenting the ranked list to the first and second participants during the electronic discussion, the experts on the ranked list being selectable by the first and second participants and
    responsive to selection of an expert from the ranked list, sending an invitation to the expert inviting the expert to join the electronic discussion.

2. The method of claim 1, wherein determining the set of social closeness scores includes:

determining whether an expert has previously worked with the first or second participant or whether the expert has participated as an expert for the topic for the first or second participant.

3. The method of claim 1, further comprising:
adding a highest-ranked expert from the ranked list as a participant of the electronic discussion.

4. A computer system comprising:
one or more processors, one or more computer-readable memories, and one or more computer-readable, tangible storage devices; and
program instructions, stored on at least one of the one or more storage devices for execution by at least one of the one or more processors via at least one of the one or more memories to:
analyze a text portion of a discussion thread generated during an electronic discussion in a social software system between a first participant and a second participant;
extract a topic from the text portion;
determine, for the topic, a set of experts associated with the social software system, the set of experts having a level of expertise in the topic;
generate a list of experts from the set of experts, each expert on the list of experts being socially connected via the social software system with at least one of the first participant and the second participant;
determining a set of social closeness scores of each expert in the list of experts with respect to the first participant and with respect to the second participant;
arrange the list of experts as a ranked list by ranking the experts according to a summarized score that combines the set of social closeness scores with a degree of experience of each corresponding expert of the list of experts;
present the ranked list to the first and second participants during the electronic discussion, the experts on the ranked list being selectable by the first and second participants and
responsive to selection of an expert from the ranked list, send an invitation to the expert inviting the expert to join the electronic discussion.

5. The system of claim 4, wherein program instructions to determine the set of social closeness scores includes:
program instructions to determine whether an expert has previously worked with the first or second participant or whether the expert has participated as an expert for the topic for the first or second participant.

6. The system of claim 4, further comprising:
program instructions to add a highest-ranked expert from the ranked list as a participant of the electronic discussion.

7. A computer program product comprising a computer-readable storage medium having program code embodied therewith, the program code executable by a computing device to:
analyze a text portion of a discussion thread generated during an electronic discussion in a social software system between a first participant and a second participant;
extract a topic from the text portion;
determine, for the topic, a set of experts associated with the social software system, the set of experts having a level of expertise in the topic;
generate a list of experts from the set of experts, each expert on the list of experts being socially connected via the social software system with at least one of the first participant and the second participant;
determining a set of social closeness scores of each expert in the list of experts with respect to the first participant and with respect to the second participant;
arrange the list of experts as a ranked list by ranking the experts according to a summarized score that combines the set of social closeness scores with a degree of experience of each corresponding expert of the list of experts;
present the ranked list to the first and second participants during the electronic discussion, the experts on the ranked list being selectable by the first and second participants and
responsive to selection of an expert from the ranked list, send an invitation to the expert inviting the expert to join the electronic discussion.

8. The program product of claim 7, wherein code to determine the set of social closeness scores includes:
program instructions to determine whether an expert has previously worked with the first or second participant or whether the expert has participated as an expert for the topic for the first or second participant.

9. The program product of claim 7, further comprising:
code to add a highest-ranked expert from the ranked list as a participant of the electronic discussion.

* * * * *